United States Patent [19]

Beer

[11] 4,360,286
[45] Nov. 23, 1982

[54] COUPLING ELEMENT FOR SUPPORTS HAVING AN UNDERCUT LONGITUDINAL GROOVE

[75] Inventor: Heinz Beer, Elz, Fed. Rep. of Germany

[73] Assignee: Syma Intercontinental AG, Kirchberg, Switzerland

[21] Appl. No.: 198,000

[22] PCT Filed: Feb. 15, 1980

[86] PCT No.: PCT/CH80/00022
§ 371 Date: Oct. 19, 1980
§ 102(e) Date: Oct. 10, 1980

[87] PCT Pub. No.: WO80/01709
PCT Pub. Date: Aug. 21, 1980

[30] Foreign Application Priority Data

Feb. 19, 1979 [DE] Fed. Rep. of Germany ....... 2906281

[51] Int. Cl.³ .............................................. F16B 7/04
[52] U.S. Cl. .................................. 403/201; 403/255
[58] Field of Search ............... 403/187, 252, 255, 254, 403/230, 297, 201

[56] References Cited

U.S. PATENT DOCUMENTS 3,338,602  8/1967  Arnd ................................. 403/252

FOREIGN PATENT DOCUMENTS 1054320  4/1959  Fed. Rep. of Germany ...... 403/252
2103504  7/1972  Fed. Rep. of Germany ...... 403/297
2095063  2/1972  France .
2298721  8/1976  France ............................. 403/230
47-14527  1/1972  Japan ................................ 403/230

*Primary Examiner*—Andrew V. Kundrat
*Attorney, Agent, or Firm*—Lilling & Greenspan

[57] ABSTRACT

The connector is intended for beams having longitudinal, undercut grooves, the coupling elements engaging in these grooves. It consists of coupling elements that can swing freely in the transverse plane of the groove; these coupling elements have hook heads, the head thickness of which, taken in total, is less than the width of the entry of the groove. They are pressed into contact with the two opposing walls of the constricted entry of the groove by an adjuster; the adjuster is installed in one coupling element in such a manner as to be adjustable by external action. The pressure exerted by the adjuster can be transmitted to the other coupling element through a spring. Equalized contact pressure on the walls of the groove is achieved by the coupling elements.

5 Claims, 7 Drawing Figures

COUPLING ELEMENT FOR SUPPORTS HAVING AN UNDERCUT LONGITUDINAL GROOVE

The invention relates to connectors for beams which have a longitudinal, T-shaped, undercut groove in which the aforesaid connectors engage.

German patent specification No. 1 054 320 describes a frame that comprises a bracket that is secured to a wall and a rail that is held by this bracket. In this frame, the rail has a longitudinal groove that is of T cross-section and a constricted entry in which the arms of the bracket engage. The arms are arranged in pairs, each having a hook head and which swing in opposition to each other in a common plane. The height of the hook heads is considerably less than the entry width of the groove. A screw member that engages near the hook head serves to support the arms and secure the engagement of their hook heads in the undercut portion of the groove. The hook heads rest on one-piece arms that move flexibly against each other and which, as a result of their unit construction, cannot move freely.

In a similar frame, described in U.S. Pat. No. 3,371,454 horizontal bars can be joined to a vertical column by means of coupling elements that engage in longitudinal grooves, these bars being tightened by screws so as to ensure engagement. For the most part, these coupling members are housed in the interior of the bars coincide, as mirror images, vis-a-vis the central plane of the column. In this type of construction the hook heads are incapable of free movement because of their unit construction.

Swiss patent application No. 442 870 describes a profile rail connection that is based on profile rails with T-shaped, profiled installation areas that can be gripped, pincer-like, by the clamping arms that are housed in the profile rail sections that are to be joined and can be adjusted vis-a-vis each other.

British Pat. No. 951,322 describes a bracket arrangement in which cross-beams can be secured to C-shaped profile rails at a selected length. At the foot end the cross-beam is bent to form a hook and supplemented by a tightener that has a hook head that is orientated in the opposite direction. The cross-beams must be slid into place from the ends of the rails.

German disclosure No. 1 775 802 describes a frame, the beams of which are provided with a T-shaped, undercut groove in which the coupling elements of the end portions engage, and which can be pressed against the two opposite walls of the constricted entry of the groove by means of an adjuster; in this connection one coupling element has a hook head, while the other coupling element is formed by lugs secured to the junction portion, which, viewed longitudinally along the groove, are located above and below the hook head of the first coupling element. This arrangement entails the disadvantage that only one coupling element has any resistance to tensile loads, while the other coupling element can only act as a guide. In addition, the pressure area of the one coupling element in relation to the other coupling element on the wall of the groove is relatively small, which can lead to escape from the groove.

The invention addresses the task of eliminating the disadvantages associated with state of the art connectors, particularly that of avoiding the irksome movement of the connectors that occurs prior to final tightening while, at the same time, ensuring equal pressure on both walls of the groove.

According to the invention there is provided a connector for beams with a longitudinal undercut groove adapted to receive the connector comprising a first coupling element and a second coupling element adapted to swing transverse to the plane of the groove, each said connector element including a hook head of a thickness slightly less than half of the width of the opening of said groove and an adjuster held in said first and second coupling elements, which adjuster resiliently biases said first coupling element away from said second coupling element.

As provided for by the invention the problem of prior art devices is solved in that the connectors consist of coupling elements that can swing freely in the transverse plane of the connector; these arms have continuous hook heads, the head thickness of which, taken in total, is less that the width of the entry of the groove, and which can be pressed against the two opposing sides of the constricted entry of the groove, in which connection the adjuster is installed on one coupling element in such a manner as to be adjustable by external action, while the pressure of the adjuster can be transmitted to the other coupling element by a spring.

It is expedient that the spring be so dimensioned that in the unloaded state is forces the coupling elements apart to the point that they are separated by a distance that is greater than the width of the entry of the groove. Thus, by pressing the two coupling elements together it is possible to slide them into the groove. Because of the pressure exerted by the spring the coupling elements are pressed against the opposing walls of the constricted entry of the groove, which means that the irksome unstable movement that takes place prior to final securing is eliminated by the adjuster.

In order to provide for the transmission of the pressure exerted by the adjuster through the spring to the second coupling element an arrangement is preferred whereby the spring pressure is not transmitted by direct contact between the spring and the second coupling element, but whereby a movable guide bushing is interposed between the spring and the coupling element. This improves the manner in which the spring is guided. In addition, in a preferred version of the present invention the movable guide sleeve, which is provided with a lock that abuts against the second coupling element, protrudes somewhat from the coupling element. This protruding portion, which can be easily slid into the interior of the coupling element by the use of an appropriate degree of force, is no hindrance when the connector is being slid into a corresponding space within the beam if it is pressed into the space in the beam when the beam and the connector are being assembled, and then until such time as the portion of the guide bushing that has been moved back locks into a corresponding bore in the side of the space within the beam. When the connector is being pushed into the interior of the beam the guide sleeve presses against the wall of the beam, thereby to a certain extent serving to hold the two elements together. Because the guide sleeve locks into the corresponding bore in the side of the beam, whereupon the guide sleeve does not protrude beyond the side of the beam, the coupling elements are prevented from sliding out of the beam. Thus the coupling elements can be ultimately secured to the beam by means of the adjuster without further support and without the insertion of a separate screw through the side of the beam. In order to remove the connector it is only necessary to loosen the adjuster and depress the guide sleeve, whereupon the connector can be withdrawn at the hook heads. For the remainder, when the beam is being disassembled the installed coupling elements, both when tightened, i.e., with the hook heads are engaged, and when the hook heads are loose, with the spring guide sleeve and the installed adjuster always flush within the bore in the side of the beam, the beam cannot get scratched by protruding components.

Thus, the former, irksome insertion of screws and adjusters, and the concomitant undesirable movement of the connectors is avoided. The separation of the adjuster from the beam by the spring guide sleeve, as foreseen in the present invention, hinders tearing out and damage to the bore in the beam, as well as accidental slipping of installation tools. When the coupling elements are tightened or loosened, the adjuster and the guide sleeve remain pushed into the beam to the degree that when the coupling elements that are locked into the beam are used or transported, damage due to scratching and abrasion will be precluded. In addition, the continuous configuration of the hook heads that is provided for by the present invention simultaneously ensures equal contact pressure along the walls of the groove, such pressure preserving the beam material and also being effective over the whole area of the wall.

For the purpose of illustration but not of limitation the invention will be hereinafter described with reference to the accompanying drawings, in which.

Figure 1:
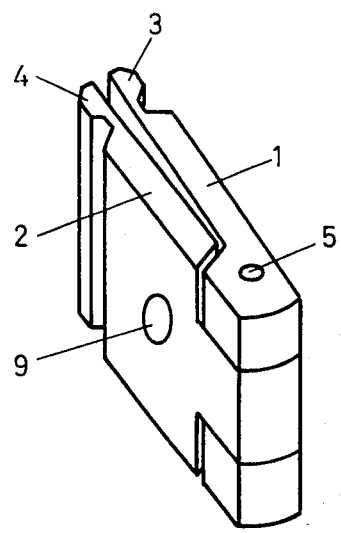
FIG. 1 shows in perspective, the coupling elements according to one embodiment of the invention.
Figure 2:
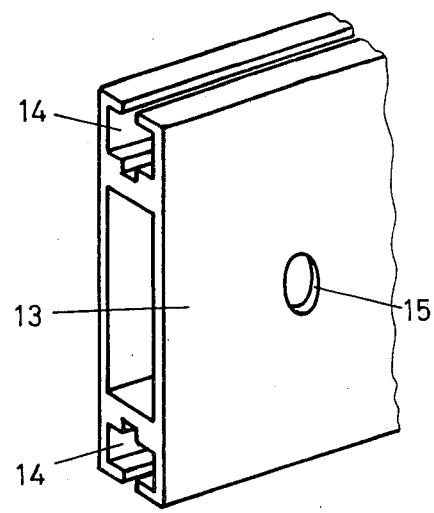
FIG. 2 shows a beam that matches the coupling elements.
Figure 3:
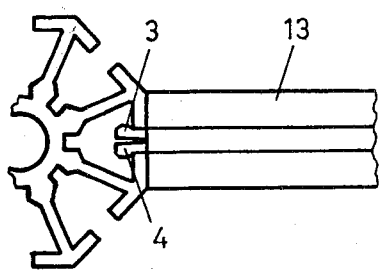
Figure 4:
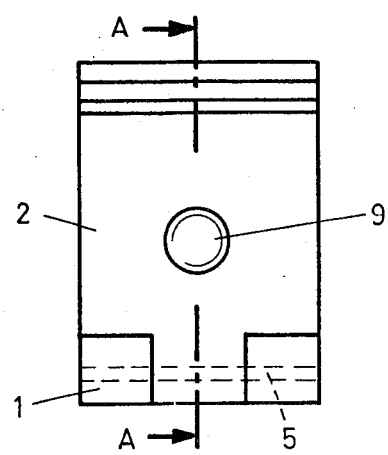
Figure 5:
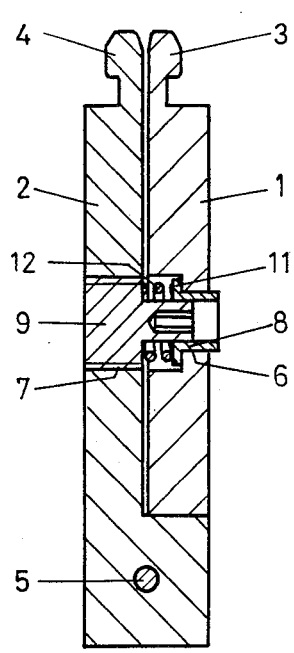
Figure 6:
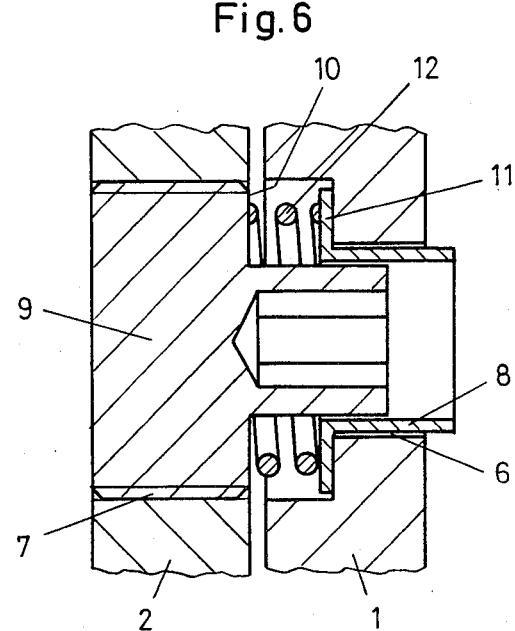
Figure 7:
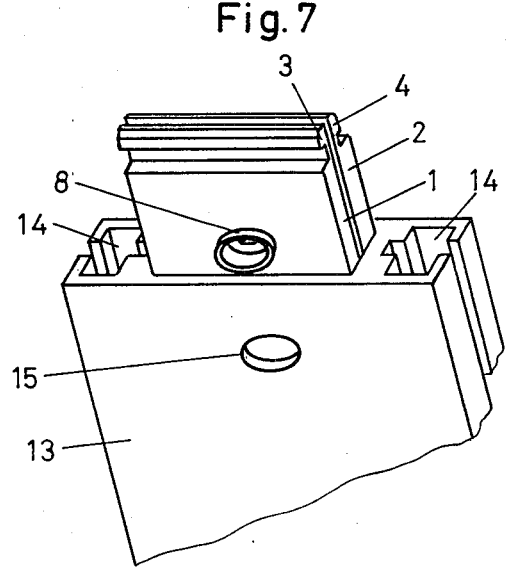

FIG. 3 shows coupling elements that are combined with a special version of the beam in order to make angled combinations possible, FIG. 4 shows a side elevation of a pair of coupling elements, FIG. 5 shows a cross-section of the pair of coupling elements shown in FIG. 4, on the line A—A, FIG. 6 shows an enlarged section from FIG. 5, and FIG. 7 shows a perspective view of the coupling elements partially inserted into the corresponding space in the beam.

The coupling elements 1, 2 with the continuous hook heads 3, 4 are connected by means of a bolt 5. The two coupling elements 1, 2 contain coaxial first bore 6 in element 1 and second bore 7 in element 2 the latter having a thread and first bore 6 having a step in its interior, the outer end being of smaller diameter than the inner end of the bore. An adjuster including a guide sleeve 8, spring 12 and adjuster screw 9 is locked in first bore 6 and third bore 7. The flanged guide sleeve 8 is installed in the inner end with the smaller diameter, and the flange of this sleeve abuts against the step in the bore. An adjuster screw 9 is installed in a thread inside the opposite second bore 7 and this tapers by steps towards the opposite end. As best seen in FIG. 6, spring 12 is installed between this step 10 and the flanged edge 11 of the guide sleeve 8. This transmits the pressure exerted by the adjuster screw to the coupling element 1. The arrangement of the thread in the second bore 7 and the tapered stepped first bore 6 can be in either coupling element 1 or 2.

The beam 13 has longitudinal, T-shaped, undercut grooves 14 in which the hook heads 3, 4 of the coupling elements 1, 2 can engage; between the grooves 14 there is a space to accommodate the coupling elements and there is a third bore 15 in the side of this space, of such dimensions as permit it to accommodate the protruding portion of guide bushing 8. As a result of the guide bushing 8 springing into the third bore 15 in the beam 13, additional support prior to final and permanent attachment is unnecessary. It is also unnecessary to insert a special adjuster into the coupling elements through the third bore 15.

The embodiments of the invention in which an exclusive property or privilege is claimed are defined as follows:

1. A connector for beams with a longitudinal undercut groove adapted to receive the connector comprising a first coupling element and a second coupling element adapted to swing transverse to the plane of the groove, each said connector element including a hook head of a thickness slightly less than half the width of the opening of said groove and an adjuster which includes a spring held in said first and second coupling elements, which adjuster resiliently biases said coupling element away from said second coupling element, said spring being capable of biasing apart the hook head of the first and second coupling elements by a distance that is, at least, greater than the width of the groove entry, said adjuster including a guide sleeve arranged between the spring and said first coupling element, the aforesaid guide sleeve being movable and protruding beyond the outer side of the first coupling element through a first bore, said first bore adapted to align with a third bore through the beam when in the connected position, such that a projecting portion of said guide sleeve can lock into said third bore.

2. A connector as defined in claim 1 wherein said first coupling element has a first bore and said second coupling element has a second bore co-axial with said first bore when said first and said second coupling elements abut, wherein said second bore is threaded and wherein said first bore has an interior step.

3. A connector as defined in claim 2 wherein the adjuster includes a guide sleeve arranged between a spring and said first coupling element, the said guide sleeve being movable and protruding beyond the outer side of the first coupling element through a first bore, said first bore adapted to align with a third bore through the beam when in the connected position, such that a projecting portion of said guide sleeve can lock into said third bore.

4. A connector according to claim 3 wherein the guide sleeve is flanged and installed with its smallest diameter inside said first bore which is stepped and adapted such that the flange abuts against the step in the said first bore.

5. A connector as defined in either of claims 3 or 4 wherein said adjuster includes an adjuster screw which is threaded and stepped and is contained in said second bore and wherein the spring is installed between the step in the adjuster and the flange edge of the guide sleeve.

* * * * *